United States Patent
Siess et al.

(10) Patent No.: US 12,439,171 B2
(45) Date of Patent: Oct. 7, 2025

(54) MULTI-SPECTRAL OPTICAL SENSOR AND SYSTEM

(71) Applicant: ams Sensors Germany GmbH, Jena (DE)

(72) Inventors: Gunter Siess, Kraftsdorf (DE); Volker Mannheim, Berlin (DE); Holger Pless, Bienstädt (DE); Julius Komma, Jena (DE)

(73) Assignee: AMS SENSORS GERMANY GMBH, Jena (DE)

( * ) Notice: Subject to any disclaimer, the term of this patent is extended or adjusted under 35 U.S.C. 154(b) by 206 days.

(21) Appl. No.: 18/248,246

(22) PCT Filed: Oct. 6, 2021

(86) PCT No.: PCT/EP2021/077534
§ 371 (c)(1),
(2) Date: Apr. 7, 2023

(87) PCT Pub. No.: WO2022/074047
PCT Pub. Date: Apr. 14, 2022

(65) Prior Publication Data
US 2023/0388660 A1  Nov. 30, 2023

(30) Foreign Application Priority Data
Oct. 8, 2020 (GB) ...................... 2015948

(51) Int. Cl.
*H04N 23/76* (2023.01)
*G01J 3/28* (2006.01)
(Continued)

(52) U.S. Cl.
CPC ............ *H04N 23/76* (2023.01); *G01J 3/2803* (2013.01); *G01J 3/2823* (2013.01); *H04N 23/71* (2023.01);
(Continued)

(58) Field of Classification Search
CPC ........ H04N 23/76; H04N 23/71; H04N 23/88; H04N 25/13; H04N 25/702; G01J 3/2803;
(Continued)

(56) References Cited

U.S. PATENT DOCUMENTS

2012/0098926 A1 *  4/2012  Kweon ................ G06T 1/00
  348/308
2012/0146517 A1   6/2012  Gommans et al.
(Continued)

FOREIGN PATENT DOCUMENTS

| CN | 102483353 A | 5/2012 |
| CN | 102741671 A | 10/2012 |
| CN | 102845053 A | 12/2012 |

OTHER PUBLICATIONS

Gangl, M. (Authorized officer), International Search Report and Written Opinion issued in PCT/EP2021/077534 dated Jan. 20, 2022, 14 pages.
(Continued)

Primary Examiner — Nicholas G Giles
(74) Attorney, Agent, or Firm — MH2 Technology Law Group LLP

(57) ABSTRACT

A monolithic semiconductor chip defines a plurality of subarrays of optical detector regions, wherein each subarray of optical detector regions includes a corresponding plurality of optical detector regions and wherein each subarray of optical detector regions has the same relative spatial arrangement of optical detector regions as each of the other subarrays of optical detector regions. A multi-spectral optical sensor comprises the monolithic semiconductor chip, a plurality of optical filters, and a plurality of lens elements, wherein each optical filter is aligned between a corresponding lens element and a corresponding subarray of optical detector regions such that light which is incident on any one of the lens elements along a direction of incidence converges
(Continued)

through the corresponding optical filter onto a corresponding one of the optical detector regions of the corresponding subarray of optical detector regions, which corresponding one of the optical detector regions depends on the direction of incidence. Such a multi-spectral optical sensor may be used to measure spectral information relating to different parts or sectors of a scene captured by an image sensor or a camera. A multi-spectral optical system and an image sensing system are also disclosed which comprise the multi-spectral optical sensor.

18 Claims, 6 Drawing Sheets

(51) Int. Cl.
    *H04N 23/71*     (2023.01)
    *H04N 23/88*     (2023.01)
    *H04N 25/13*     (2023.01)

(52) U.S. Cl.
    CPC ............. *H04N 23/88* (2023.01); *H04N 25/13* (2023.01); *G01J 2003/2806* (2013.01); *G01J 2003/2813* (2013.01); *G01J 2003/2816* (2013.01)

(58) Field of Classification Search
CPC ...... G01J 3/2823; G01J 1/4204; G01J 3/0259; G01J 3/0208
See application file for complete search history.

(56) References Cited

U.S. PATENT DOCUMENTS

| | | |
|---|---|---|
| 2014/0267849 A1* | 9/2014 | Geelen ................ G02B 3/0043 348/278 |
| 2014/0293091 A1 | 10/2014 | Rhoads et al. |
| 2015/0195471 A1 | 7/2015 | Kweon |
| 2016/0165202 A1 | 6/2016 | Lee |
| 2017/0034499 A1 | 2/2017 | Doron et al. |
| 2019/0305016 A1 | 10/2019 | Tsang et al. |
| 2021/0247232 A1 | 8/2021 | Tack et al. |

OTHER PUBLICATIONS

Lindner, N. (Authorized officer), International Preliminary Report on Patentability issued in PCT/EP2021/077534 dated Mar. 28, 2023, 12 pages.

Xue, Z. (Examiner); First Chinese Office Action Issued In Corresponding Chinese Patent Application No. 202180068508.3 Dated Jul. 25, 2025, with English Language Translation, 21 pages.

* cited by examiner

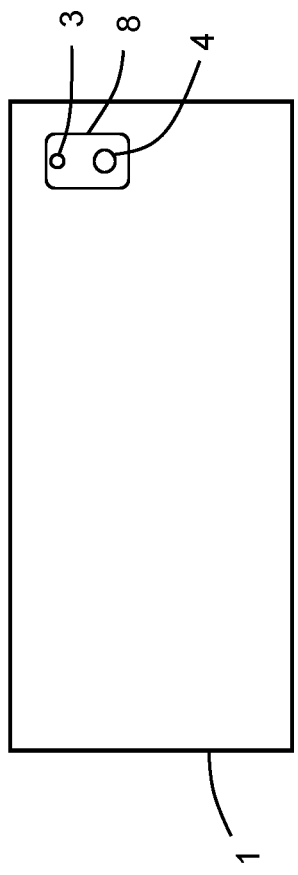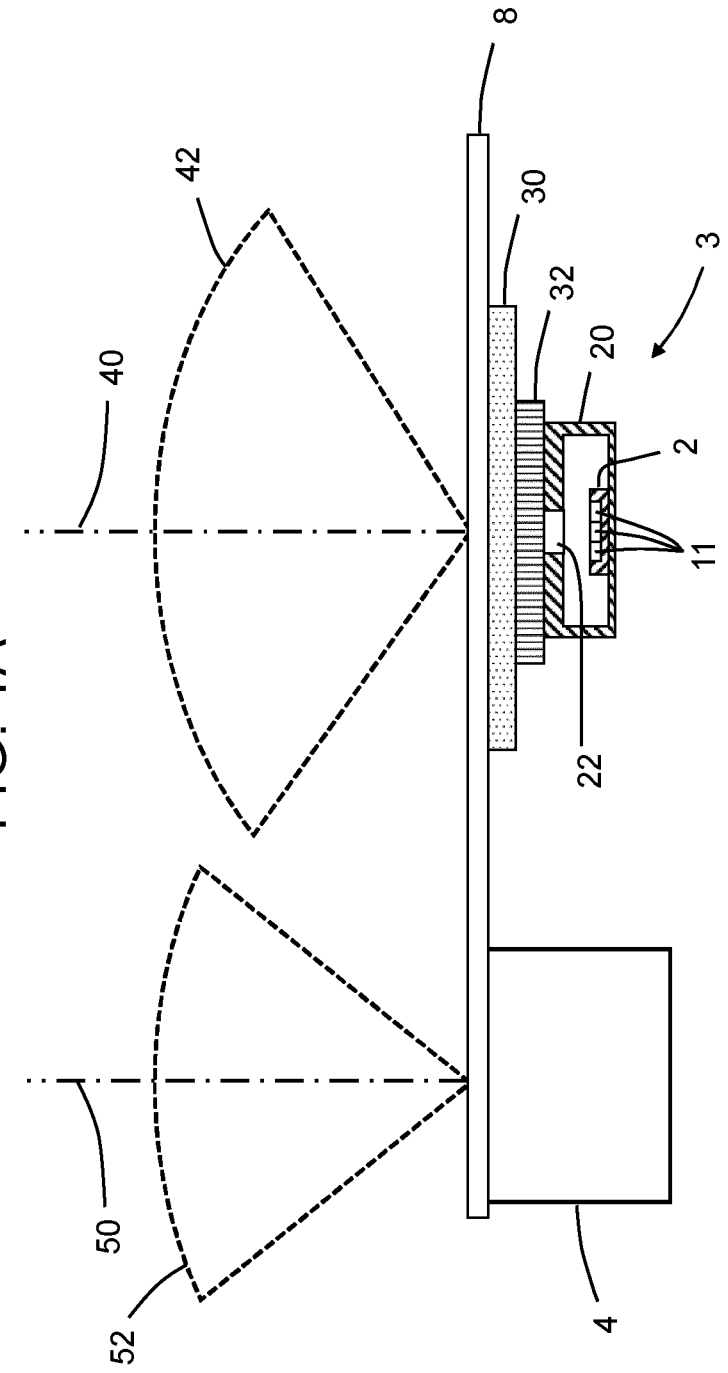

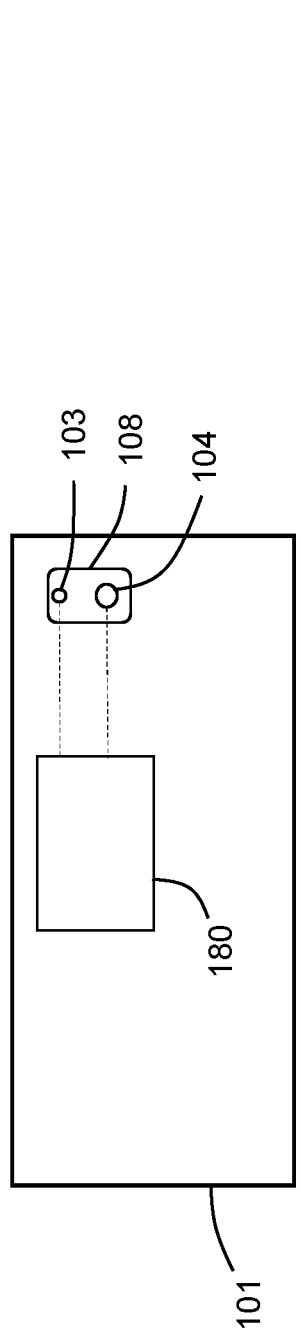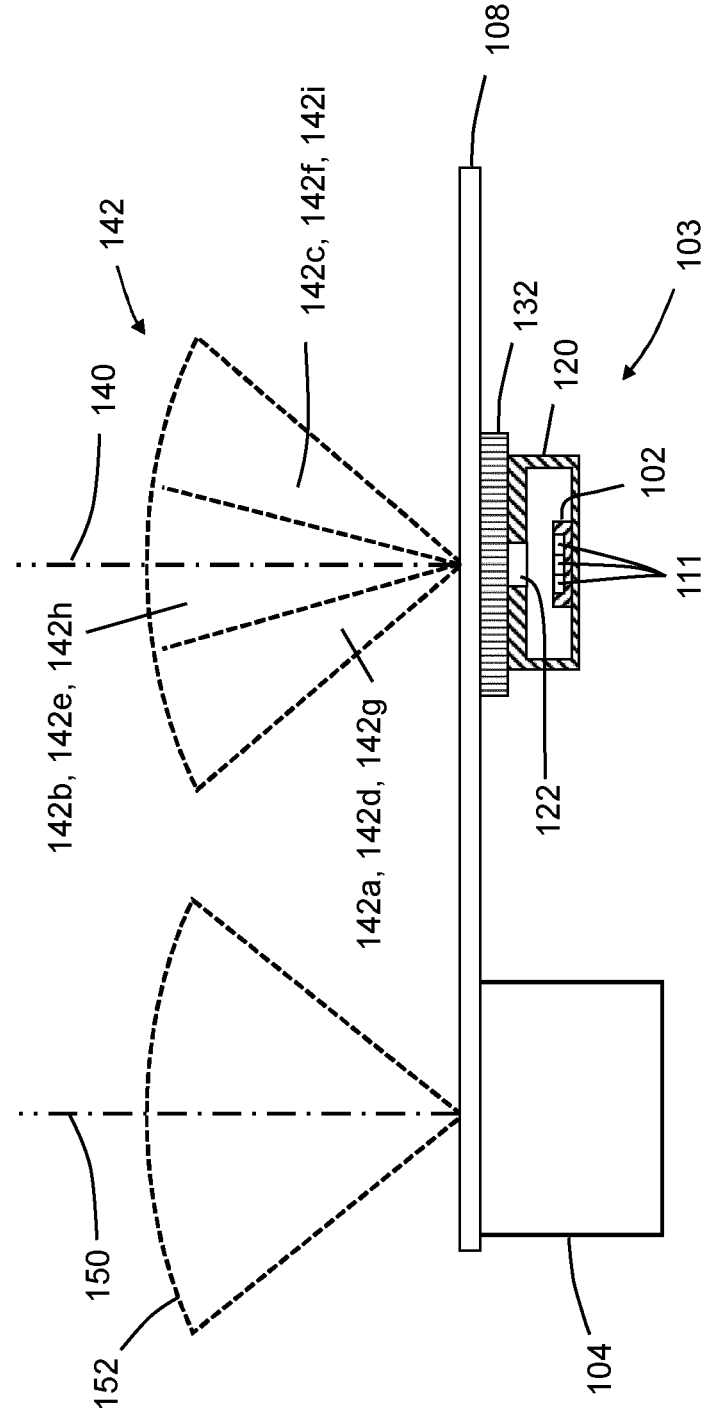
FIG. 2A
FIG. 2B

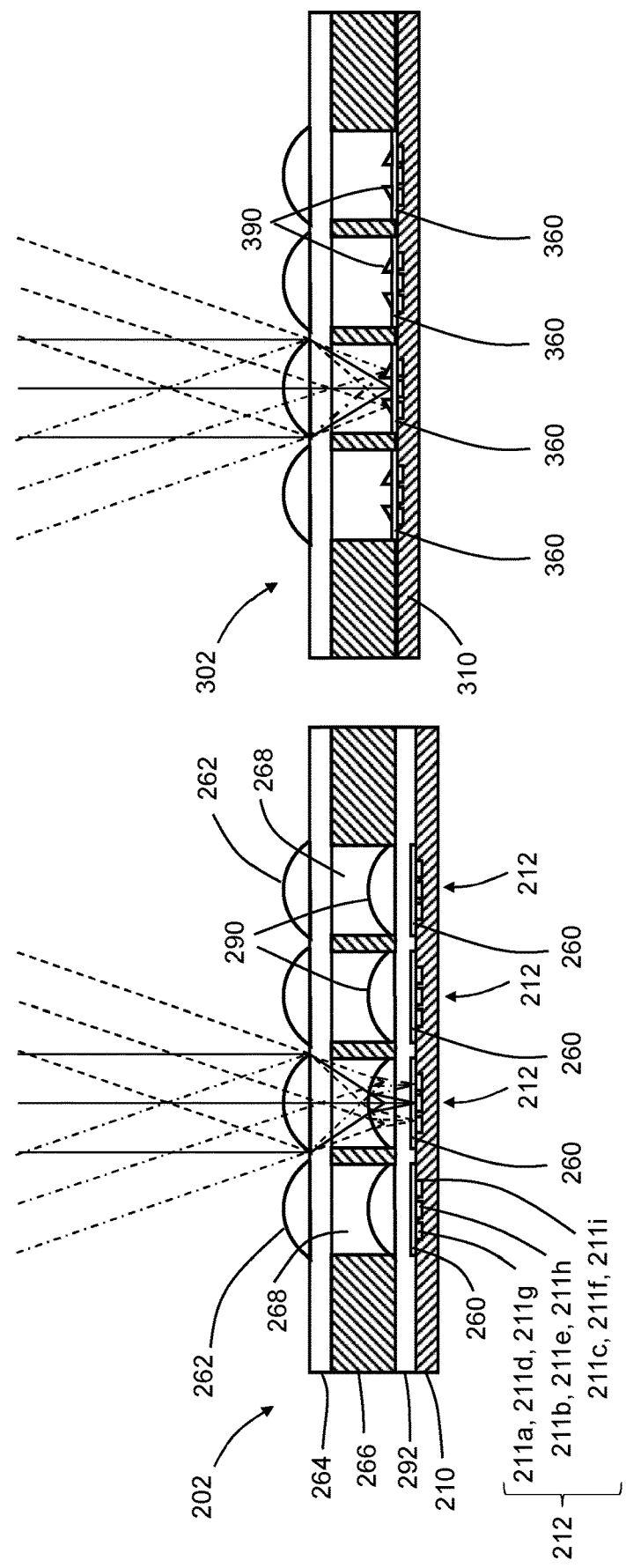

MULTI-SPECTRAL OPTICAL SENSOR AND SYSTEM

CROSS-REFERENCE TO RELATED APPLICATIONS

The present application is the national stage entry of International Patent Application No. PCT/EP2021/077534, filed on Oct. 6, 2021, and published as WO 2022/074047 A1 on Apr. 14, 2022, which claims the benefit of priority of Great Britain Patent Application No. 2015948.9, filed on Oct. 8, 2020, the disclosures of all of which are incorporated by reference herein in their entireties.

FIELD

The present disclosure relates to a multi-spectral optical sensor, a multi-spectral optical system including the multi-spectral optical sensor, an image sensing system including the multi-spectral optical system, and a method of using the multi-spectral optical sensor for use, in particular though not exclusively, for adjusting a captured image of a scene for the effects of ambient illumination on different parts of the scene.

BACKGROUND

Color constancy is a desirable attribute of image-sensing devices, such as cameras. Color constancy refers to a capability of observing a feature or object as being of a relatively constant color under different illuminations. That is, an appearance of an image captured by a camera may be affected by an ambient illumination.

By means of example, if a color temperature of an ambient light source is relatively low, e.g. in the region of 3000 Kelvin as may be the case for an incandescent light source, an image of a white object exposed to the ambient light source will comprise a reddish hue. In contrast, for an ambient light source with a high color temperature, e.g. in the region of 6000 Kelvin as may be the case for daylight on an overcast day, the image of the white object will comprise a slight blueish hue. That is, the object will be observed by a camera as comprising a color that depends upon the illumination of the object by the ambient light source.

It is known to compensate for such effects by using a multi-spectral ambient light sensor (ALS) to measure spectral information relating to a scene. For example, with reference initially to FIG. 1A, there is shown a smartphone 1 including a multi-spectral ALS arrangement 3, a camera 4 and cover glass 8 which covers the multi-spectral ALS arrangement 3 and the camera 4, wherein the multi-spectral ALS arrangement 3 is configured to measure the spectral distribution of light from a scene incident on the camera 4. FIG. 1B shows a detailed cross-sectional view of the multi-spectral ALS arrangement 3 and the camera 4. The multi-spectral ALS arrangement 3 includes a multi-spectral ALS sensor 2 having a plurality of optical detector regions 11. The multi-spectral ALS 2 is configured so that each optical detector region 11 detects a different range of wavelengths, for example because the multi-spectral ALS 2 includes a plurality of different optical filters (not shown explicitly in FIG. 1B), wherein each optical filter is configured to only transmit a corresponding different range of wavelengths onto a corresponding one of the optical detector regions 11. In the interests of clarity, only three optical detector regions 11 are shown in FIG. 1B. However, one of ordinary skill in the art will understand that the multi-spectral ALS sensor 2 may have more than three optical detector regions 11 or less than three optical detector regions 11.

The multi-spectral ALS arrangement 3 includes a housing 20 which houses the multi-spectral ALS sensor 2. The multi-spectral ALS arrangement 3 further includes a diffuser 30 and an IR cut filter 32 located between the cover glass 8 and the housing 20.

The housing 20 defines an aperture or a window 22 for admitting light into the housing 20 via the cover glass 8, the diffuser 30 and the IR cut filter 32. The multi-spectral ALS arrangement 3 has an optical axis 40 which is normal to a front surface of the multi-spectral ALS 2. Moreover, as will be understood by one of ordinary skill in the art, use of the diffuser 30 provides the multi-spectral ALS arrangement 3 with a field of view (FOV) 42 which defines a large solid angle around the optical axis 40. Each optical detector region 11 detects a different range of wavelengths incident on the optical detector region 11 from all of the different directions of incidence across the entire FOV 42 of the multi-spectral ALS arrangement 3.

The camera 4 has an optical axis 50 which is normal to a front surface of an image sensor (not shown) of the camera 4 and which is parallel to the optical axis 40 of the multi-spectral ALS arrangement 3. The camera 4 has a FOV 52 which defines a solid angle around the optical axis 50 of the camera 4, wherein the solid angle of the FOV 52 of the camera 4 is comparable to, or less than, the solid angle of the FOV 42 of the multi-spectral ALS arrangement 3.

The smartphone 1 uses white balancing, and preferably automatic white balancing (AWB), to adjust the coloration of the images captured under different illuminations. For example, the smartphone 1 may have predefined settings for typical lighting conditions such as daylight, fluorescent lighting or incandescent lighting, wherein in some instances the predefined settings may be automatically selected.

Existing techniques for white balancing include image processing by applying an algorithm based on a "Gray-World Theory" or a "White Patch Theory". The Gray World Theory is based on an assumption that the average reflectance in a captured image is achromatic. That is, the average of three color channels: red, green and blue, should be roughly equal. The White Patch Theory is based on an assumption that a brightest pixel in a captured image corresponds to a reflection of the ambient light source, and therefore the brightest pixel may correspond to a spectrum of the ambient illumination. Both approaches have known limitations and, notably, both approaches tend to produce substantially different results. Accordingly, it is desirable to be able to correct a captured image of a scene for the effects of ambient illumination on the scene, without incurring the shortcomings of the prior art AWB methods.

Moreover, different parts of a scene may be subject to different ambient lighting conditions. For example, even different parts of a uniform colored object in a scene may appear differently according to the corresponding ambient lighting conditions of the different parts of the uniform colored object. Accordingly, it is desirable to be able to correct a captured image of a scene for the effects of different ambient illumination conditions on different parts of the scene, without incurring the shortcomings of the prior art AWB methods.

SUMMARY

According to an aspect of the present disclosure there is provided a multi-spectral optical sensor comprising:

a monolithic semiconductor chip defining a plurality of subarrays of optical detector regions;

a plurality of optical filters; and a plurality of lens elements, wherein each subarray of optical detector regions includes a corresponding plurality of optical detector regions, wherein each subarray of optical detector regions has the same relative spatial arrangement of optical detector regions as each of the other subarrays of optical detector regions, and wherein each optical filter is aligned between a corresponding lens element and a corresponding subarray of optical detector regions such that light which is incident on any one of the lens elements along a direction of incidence converges through the corresponding optical filter onto a corresponding one of the optical detector regions of the corresponding subarray of optical detector regions, which corresponding one of the optical detector regions depends on the direction of incidence.

Such a multi-spectral optical sensor may be used to measure spectral information relating to different parts or sectors of a scene captured by an image sensor or a camera. This may allow gradient white balancing to be used to adjust the coloration of an image of the scene, for example to more accurately reproduce the image of the scene perceived by a human observer of the scene. Such a multi-spectral optical sensor may be particularly useful where different parts of a scene are illuminated using different ambient light sources.

Since light detected by each subarray of optical detector regions is transmitted through a corresponding optical filter, each subarray of optical detector regions may be considered to act as a monochromatic subarray of optical detector regions. The multi-spectral optical sensor may be manufactured at least in part using on-chip integration enabling wafer scale packaging. The spatial arrangement of the optical detector regions of each subarray, the optical filters and the lens elements define the sectoring of the field of view of the multi-spectral optical sensor. As a result of the symmetrical design of the monochromatic subarrays and the corresponding optical filters and lens elements, each corresponding optical detector region of different subarrays of optical detector regions detects light from the same sector of a scene, which is necessary for colorimetric analysis. Such a multi-spectral optical sensor may be used to generate sectored color and spectral information for each different region of a scene e.g. the center of the scene, border of the scene and outside areas of the scene. The sectored color and spectral information may be used to realize a gradient white balancing of a captured image of the scene with respect to different ambient light conditions in the same scene.

The plurality of subarrays of optical detector regions may be arranged in a 1D or 2D array of subarrays such as a uniform 1D or 2D array of subarrays.

Each subarray of optical detector regions has its own optical filter. The optical filter can processed, for example formed or deposited, over all of the optical detector regions of the same subarray. Consequently, the gap between the optical detector regions of the same subarray are only limited by the design rules of the monolithic semiconductor chip.

The plurality of optical detector regions of each subarray of optical detector regions may be arranged in a 1D or 2D array of optical detector regions such as a uniform 1D or 2D array of optical detector regions.

The plurality of optical detector regions of each subarray of optical detector regions may comprise a central optical detector region and one or more peripheral optical detector regions arranged around the central optical detector region.

One or more of the peripheral optical detector regions may be arcuate in shape and may be arranged circumferentially around the central optical detector region.

One or more of peripheral optical detector regions may be annular in shape and may be arranged concentrically with the central optical detector region.

The plurality of optical filters may be disposed or formed on a front surface of the monolithic semiconductor chip.

The plurality of lens elements may comprise a micro lens array (MLA) or a micro Fresnel lens array.

The plurality of lens elements may be defined by, or formed on, an optical substrate.

The multi-spectral optical sensor may comprise a spacer located between the monolithic semiconductor chip and the optical substrate.

The monolithic semiconductor chip and the optical substrate may be attached to the spacer.

The spacer may define a plurality of apertures, wherein each aperture is aligned with a corresponding lens element, a corresponding optical filter and a corresponding subarray of optical detector regions.

The spacer may define one or more opaque separators or opaque walls, wherein each separator or wall separates two adjacent apertures. Such a spacer may block optical crosstalk between different subarrays of optical detector regions.

The apertures may be formed by at least one of vertical etching, deep lithography or injection molding.

The spacer may comprise, or be formed from, an opaque material.

The spacer may comprise, or be formed from, a plastics material such as a thermosetting polymer material or a thermoplastic polymer material.

Each optical filter may comprise an optical interference filter or an optical absorption filter.

The multi-spectral optical sensor may comprise a plurality of transmissive optical elements. Each transmissive optical element may be aligned between a corresponding lens element and a corresponding optical filter such that light which is incident on any one of the lens elements converges through a corresponding transmissive optical element and a corresponding optical filter onto one of the optical detector regions of a corresponding subarray of optical detector regions. Each transmissive optical element may receive convergent light from the corresponding lens element propagating along an initial direction of propagation and may transform the received convergent light into transmitted convergent light which propagates away from the transmissive optical element along a final direction of propagation which is parallel to an optical axis of the corresponding optical filter or which defines a smaller angle with respect to an optical axis of the corresponding optical filter than the initial direction of propagation of the received convergent light.

The use of such a plurality of transmissive optical elements may serve to ensure that convergent light which is received by any one of the transmissive optical elements along an initial direction of propagation which is arranged obliquely relative to an optical axis of the corresponding optical filter, is transformed by the transmissive optical element so as to propagate towards the corresponding optical filter along a direction which is parallel to the optical axis of the corresponding optical filter or which defines a smaller angle with respect to the optical axis of the corresponding optical filter than the initial direction of propagation of the received convergent light. This may be advantageous where the optical transmission spectrum of the optical filter is dependent on the angle of incidence of the light incident on the optical filter, for example where the optical filter is an interference filter, to ensure that the light received by the optical filter is subject to the known fixed optical transmission spectrum of the optical filter regardless of the initial direction of propagation along which the convergent light is received by the corresponding transmissive optical element.

The plurality of transmissive optical elements may comprise a plurality of additional lens elements The plurality of additional lens elements may comprise a micro lens array (MLA) or a micro Fresnel lens array.

The plurality of transmissive optical elements may be defined by, or formed on, an additional optical substrate.

The additional optical substrate may be attached to a front surface of the monolithic semiconductor chip.

The spacer may be attached to a front surface of the additional optical substrate.

Each transmissive optical element may be defined by, or formed on, a corresponding optical filter.

Each optical filter of the plurality of optical filters may have a corresponding optical transmission spectrum such as a passband optical transmission spectrum.

The passband optical transmission spectra of the plurality of optical filters may span a predefined range of wavelengths. A difference between a first sum of the optical transmission values of the plurality of optical filters at a first wavelength within the predefined range of wavelengths and a second sum of the optical transmission values of the plurality of optical filters at a second wavelength within the predefined range of wavelengths may be less than a predetermined threshold.

The first sum of the optical transmission values may be equal to the second sum of the optical transmission values.

A sum of the optical transmission values of the plurality of optical filters may be the same at all wavelengths within the predefined range of wavelengths.

The optical transmission spectra of at least three of the optical filters may be selected for tristimulus detection.

The optical transmission spectra of at least three of the optical filters may correspond to respective co-ordinates of a CIE color space.

The optical transmission spectra of at least three of the optical filters may correspond to respective components of the XYZ color space.

The monolithic semiconductor chip may comprise a CCD and/or a CMOS monolithic semiconductor chip.

Each optical detector region may comprise a CCD and/or a CMOS optical detector region.

According to an aspect of the present disclosure there is provided a multi-spectral optical system, comprising:
the multi-spectral optical sensor as described above; and
a processing resource,
wherein the multi-spectral optical sensor and the processing resource are configured for communication with one another,
wherein the processing resource is configured to associate different electrical signals generated by different optical detector regions of the same subarray of optical detector regions with light incident on the multi-spectral optical sensor from a scene along corresponding different directions of incidence and to associate different electrical signals generated by corresponding optical detector regions of different subarrays of optical detector regions with light incident on the multi-spectral optical sensor from the scene along the same direction of incidence.

The different electrical signal values measured by corresponding optical detector regions of different subarrays of optical detector regions are representative of an optical spectrum of the light incident on the multi-spectral optical sensor from the scene along the same direction of incidence associated with the corresponding optical detector regions of the different subarrays of optical detector regions.

The processing resource may be configured to associate the electrical signal generated by an optical detector region with the optical transmission spectrum of the corresponding optical filter.

The processing resource may be configured to determine an ambient light source classification for each direction of incidence of the plurality of different directions of incidence based on a comparison between the electrical signal values corresponding to each direction of incidence and predefined spectral data.

The predefined spectral data may comprise a plurality of discrete spectra, each spectrum corresponding to a different known type or known kind of ambient light source.

The processing resource may be configured to adjust the electrical signal values generated by the different optical detector regions of each subarray of optical detector regions to compensate for any differences in the optical transmission spectra of the corresponding optical filter arising as a result of propagation of convergent light through the corresponding optical filter along different directions of propagation for the different optical detector regions of the same subarray of optical detector regions. Compensating for any differences in the optical transmission spectra of the corresponding optical filter in this way may be advantageous where the optical transmission spectrum of the optical filter is dependent on the angle of incidence of the light incident on the optical filter, for example where the optical filter is an interference filter.

According to an aspect of the present disclosure there is provided an image sensing system, comprising:
the multi-spectral optical system as described above; and
an image sensor having a known spatial relationship relative to the multi-spectral optical sensor,
wherein the image sensor and the processing resource are configured for communication with one another, and
wherein the processing resource is configured to adapt an image sensed by the image sensor based upon the ambient light source classification for each direction of incidence.

The processing resource may be configured to adapt the image by white-balancing the image based upon one or more parameters of the ambient light source classification for each direction of incidence.

The processing resource may be configured to adapt the image by gradient white-balancing the image based upon one or more parameters of the ambient light source classification for each direction of incidence.

The processing resource may be configured to determine the ambient light source classification for each direction by identifying a closest match between the electrical signal values corresponding to each direction of incidence and the predefined spectral data.

The processing resource may be configured to reconstruct the spectrum of the ambient light source for each direction of incidence from the electrical signal values corresponding to each direction of incidence.

The ambient light source classification may be a color temperature or a color co-ordinate.

According to an aspect of the present disclosure there is provided a monolithic semiconductor chip for a multi-spectral optical sensor, wherein the monolithic semiconductor chip defines a plurality of subarrays of optical detector regions, wherein each subarray of optical detector regions includes a corresponding plurality of optical detector regions and wherein the optical detector regions of each subarray of optical detector regions have the same spatial arrangement as the optical detector regions of each of the other subarrays of optical detector regions.

The monolithic semiconductor chip may comprise a plurality of optical filters, wherein each optical filter is disposed in front of a corresponding subarray of optical detector regions.

The plurality of optical filters may be disposed or formed on a front surface of the monolithic semiconductor chip.

According to an aspect of the present disclosure there is provided an electronic device comprising at least one of: the monolithic semiconductor chip described above, the multi-spectral optical sensor described above, the multi-spectral optical system described above or the image sensing system described above.

The electronic device may comprise a mobile electronic device such as a mobile phone, a cell phone, a smart phone, a tablet or a laptop.

According to an aspect of the present disclosure there is provided a method of using a multi-spectral optical sensor as described above, the method comprising:
associating different electrical signals generated by different optical detector regions of the same subarray of optical detector regions with light incident on the multi-spectral optical sensor from a scene along corresponding different directions of incidence; and
associating different electrical signals generated by corresponding optical detector regions of different subarrays of optical detector regions with light incident on the multi-spectral optical sensor from the scene along the same direction of incidence.

The method may comprise associating the electrical signal generated by each optical detector region of the multi-spectral optical sensor with the optical transmission spectrum of the corresponding optical filter.

The electrical signal values measured by corresponding optical detector regions of different subarrays of optical detector regions are representative of an optical spectrum of the light incident on the multi-spectral optical sensor from the scene along the same direction of incidence associated with the corresponding optical detector regions of the different subarrays of optical detector regions.

The method may comprise determining an ambient light source classification for each direction of the plurality of different directions based on a comparison between the electrical signal values corresponding to each direction of incidence and predefined spectral data.

The predefined spectral data may comprise a plurality of discrete spectra, each spectrum corresponding to a different type or kind of ambient light source.

The method may comprise:
sensing an image using an image sensor having a known spatial relationship relative to the multi-spectral optical sensor; and
adapting the sensed image based upon the ambient light source classification for each direction of incidence.

The method may comprise adapting the image by white-balancing the image based upon one or more parameters of the ambient light source classification for each direction of incidence. The method may comprise adapting the image by gradient white-balancing the image based upon one or more parameters of the ambient light source classification for each direction of incidence.

The method may comprise determining the ambient light source classification for each direction of incidence by identifying a closest match between the electrical signal values corresponding to each direction of incidence and the predefined spectral data.

The method may comprise reconstructing the spectrum of the ambient light source for each direction of incidence from the electrical signal values corresponding to each direction of incidence.

The ambient light source classification may be a color temperature or a color co-ordinate.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

A multi-spectral optical sensor, a multi-spectral optical system, an image sensing system and associated methods will now be described by way of non-limiting example only with reference to the drawings of which:

FIG. 1A is a schematic of a rear side of a prior art electronic device in the form of a prior art smartphone having a prior art multi-spectral ambient light sensor (ALS) arrangement and a camera;

FIG. 1B is a schematic cross-section of the prior art multi-spectral ALS and the camera of the prior art smartphone of FIG. 1A;

FIG. 2A is a schematic of a rear side of an electronic device in the form of a smartphone having a multi-spectral ALS arrangement and a camera;

FIG. 2B is a schematic cross-section of the multi-spectral ALS arrangement and the camera of the smartphone of FIG. 2A;

FIG. 6A is a schematic of a first alternative multi-spectral ALS; and

FIG. 6B is a schematic of a second alternative multi-spectral ALS.

DETAILED DESCRIPTION

Figure 3:
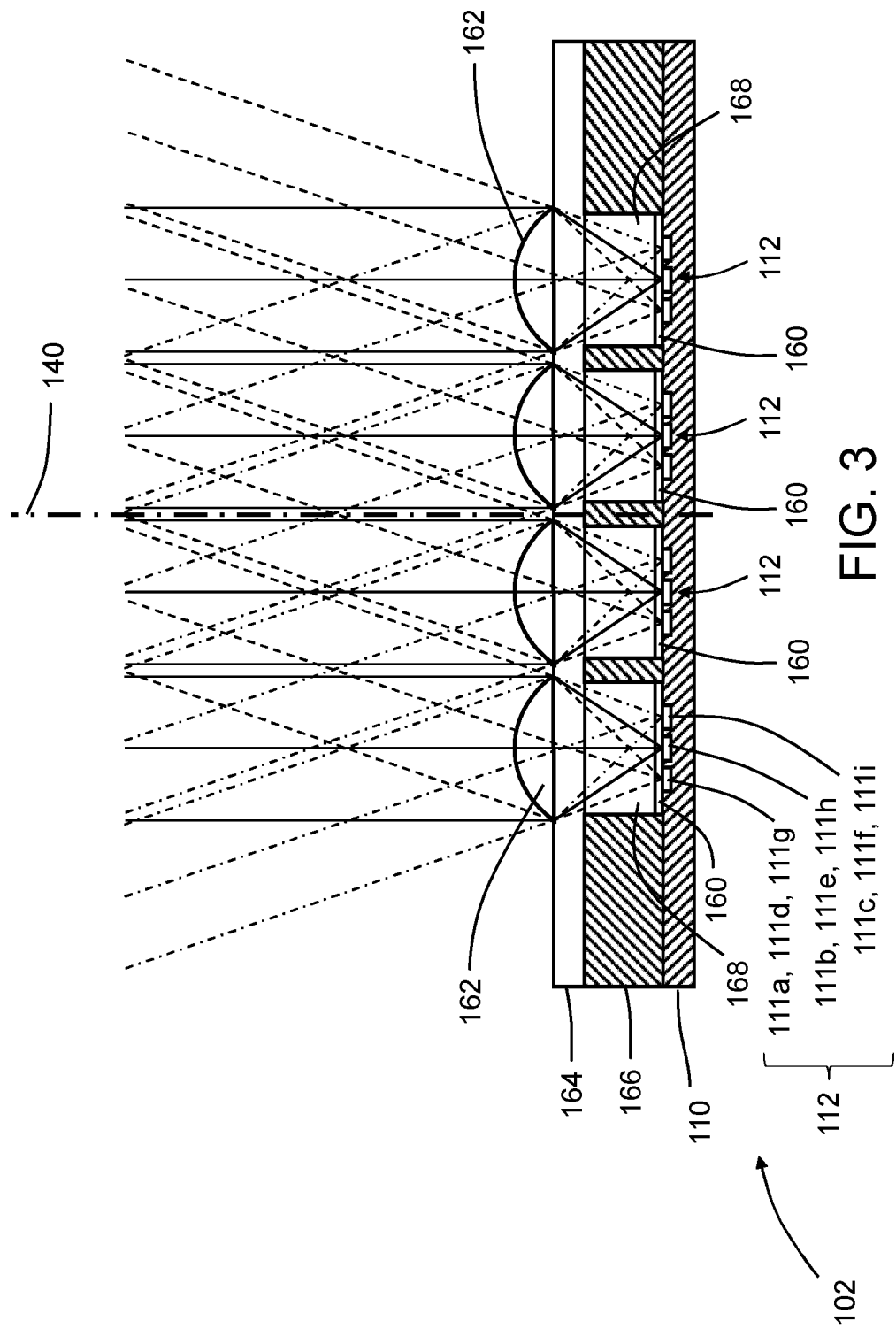
FIG. 3 is a schematic of a multi-spectral ALS of the multi-spectral ALS arrangement of FIG. 2A.

Referring initially to FIG. 2A there is shown a smartphone 101 including a multi-spectral optical sensor arrangement in the form of a multi-spectral ALS arrangement 103, a camera 104 having a known spatial relationship relative to the ALS arrangement 103, and cover glass 108 which covers the multi-spectral ALS arrangement 103 and the camera 104.

FIG. 2B shows a detailed cross-sectional view of the multi-spectral ALS arrangement 103 and the camera 104. The multi-spectral ALS arrangement 103 includes a multi-spectral ALS 102 having a plurality of optical detector regions 111. In the interests of clarity, only three optical detector regions 111 are shown in FIG. 2B. However, as will be described in more detail below, the multi-spectral ALS 102 actually defines more than three optical detector regions 111.

The multi-spectral ALS arrangement 103 includes a housing 120 which houses the multi-spectral ALS 102. The multi-spectral ALS arrangement 103 further includes an IR cut filter 132 located between the cover glass 108 and the housing 120. The housing 120 defines an aperture or a window 122 for admitting light into the housing 120 via the cover glass 108 and the IR cut filter 132. The multi-spectral ALS arrangement 103 has an optical axis 140 which is normal to a front surface of the multi-spectral ALS 102.

As will be described below, the multi-spectral ALS arrangement 103 is configured to discriminate between light incident on the multi-spectral ALS arrangement 103 from a scene along different directions of incidence and to measure the spectral distribution of the light incident on the multi-spectral ALS arrangement 103 for the different directions of incidence across a FOV 142 which defines a solid angle around the optical axis 140 of the multi-spectral ALS arrangement 103. Specifically, the multi-spectral ALS arrangement 103 is configured to discriminate between light incident on the multi-spectral ALS arrangement 103 from different sectors 142a, 142b, . . . 142i of the FOV 142 and to measure the spectral distribution of the light incident on the multi-spectral ALS arrangement 103 from each sector 142a, 142b, . . . 142i. The camera 104 also has an optical axis 150 which is normal to a front surface of an image sensor chip (not shown) of the camera 104 and which is parallel to the optical axis 140 of the multi-spectral ALS arrangement 103. The camera 104 has a FOV 152 which defines a solid angle around the optical axis 150 of the camera 104, wherein the solid angle of the FOV 152 of the camera 104 is comparable to the solid angle of the FOV 142 of the multi-spectral ALS arrangement 103.

As shown in FIG. 3, the multi-spectral ALS 102 includes a monolithic multi-spectral ALS semiconductor chip 110 shown in more detail in FIG. 4A. The monolithic multi-spectral ALS semiconductor chip 110 defines a plurality of subarrays 112 of optical detector regions in the form of twelve subarrays 112 arranged in a 3×4 array of subarrays 112, wherein the optical detector regions of each subarray 112 have the same relative spatial arrangement as the optical detector regions of each of the other subarrays 112. Specifically, each of the subarrays 112 defines a 3×3 array of optical detector regions 111a, 111b, 111c, . . . 111i.

The monolithic multi-spectral ALS semiconductor chip 110 includes plurality of optical filters 160, each optical filter 160 having a corresponding optical transmission spectrum. Each optical filter 160 is a passband optical interference filter which defines a corresponding spectral passband. Two or more of the optical filters 160 may define different spectral passbands. Moreover, each optical filter 160 is formed on, or attached to, the monolithic multi-spectral ALS semiconductor chip 110 in front of a corresponding subarray 112 of optical detector regions 111a, 111b, 111c, . . . 111i.

The multi-spectral ALS 102 further includes a plurality of lens elements 162 in the form of a micro lens array (MLA) defined by, or formed on, an optical substrate 164. The multi-spectral ALS 102 also includes a spacer 166 located between the monolithic semiconductor chip 110 and the optical substrate 164 of the MLA. The monolithic semiconductor chip 110 and the optical substrate 164 are attached to opposite sides of the spacer 166. Furthermore, the spacer 166 defines a plurality of apertures 168, wherein each aperture 168 is aligned with a corresponding lens element 162, a corresponding optical filter 160 and a corresponding subarray 112 of optical detector regions 111a, 111b, 111c, . . . 111i.

Figure 4:
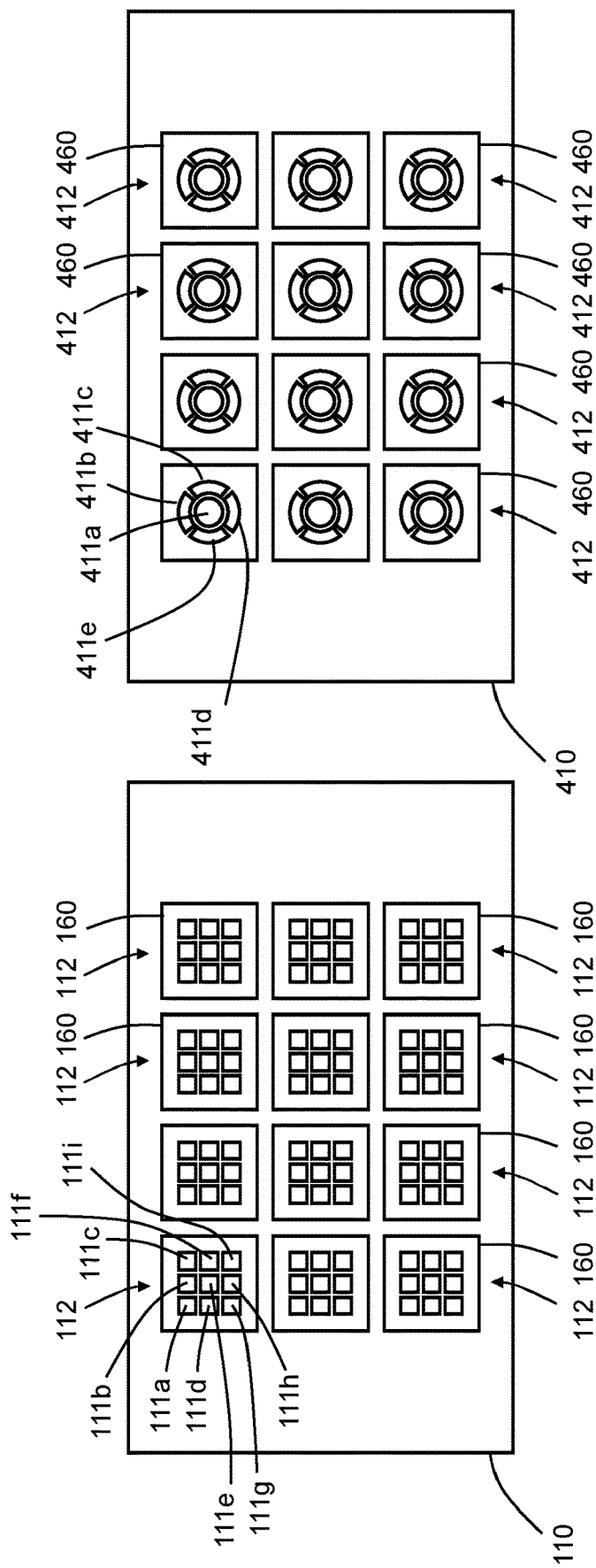
FIG. 4A is a schematic of a monolithic multi-spectral ambient light sensor (ALS) semiconductor chip of the multi-spectral ALS of FIG. 3.
FIG. 4B is a schematic of an alternative monolithic multi-spectral ALS semiconductor chip.

Each optical filter 160 is aligned between a corresponding lens element 162 and a corresponding subarray 112 of optical detector regions 111a, 111b, 111c, . . . 111i such that, in use, any light which is incident on any one of the lens elements 162 along any given direction of incidence converges through the corresponding optical filter 160 onto a corresponding one of the optical detector regions 111a, 111b, 111c, . . . 111i of the corresponding subarray 112 of optical detector regions 111a, 111b, 111c, . . . 111i, which corresponding one of the optical detector regions 111a, 111b, 111c, . . . 111i depends on the given direction of incidence. For example, light incident on any one of the lens elements 162 along a direction of incidence which is parallel to the optical axis 140 of the multi-spectral ALS 102 as represented by the solid rays shown in FIG. 4, is focused by the lens element 162 to the central optical detector region 111e of the corresponding subarray 112 through the corresponding optical filter 160. Similarly, light incident on any one of the lens elements 162 along a direction of incidence which is oblique to the optical axis 140 of the multi-spectral ALS 102 as represented by the dashed rays or the dotted-dashed rays shown in FIG. 4, is focused by the lens element 162 to one of the peripheral optical detector regions 111a, 111b, 111c, 111d, 111f, 111g, 111h, 111i of the corresponding subarray 112 through the corresponding optical filter 160 which depends on the particular direction of incidence.

Figure 5:
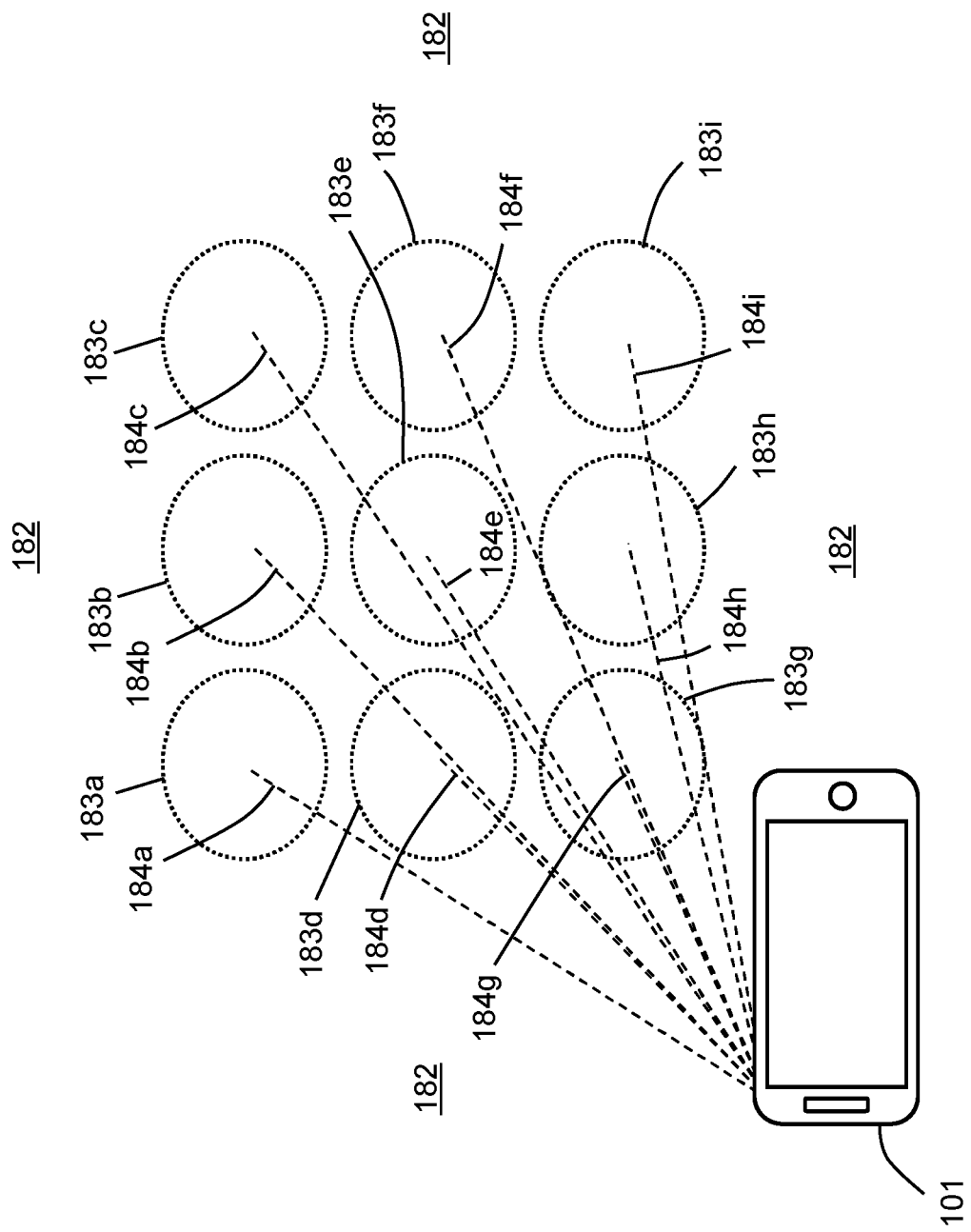
FIG. 5 illustrates the operation of an image sensing system which includes the multi-multi-spectral ALS arrangement and the camera of the smartphone of FIG. 2A.

Referring back to FIG. 2A, the smartphone 101 includes a processing resource 180 which is configured to receive data from the multi-spectral ALS 102 and the image sensor (not shown) of the camera 104. As shown in FIG. 5, the processing resource 180 is configured to associate different electrical signals generated by different optical detector regions 111a, 111b, 111c, . . . 111i of the same subarray 112 of optical detector regions with light incident on the multi-spectral ALS 102 from different regions 183a, 183b, 183c, . . . 183i of a scene generally designated 182 along corresponding different directions of incidence 184a, 184b, 184c, . . . 184i.

Conversely, the processing resource 180 is configured to associate different electrical signals generated by corresponding optical detector regions of different subarrays 112 with light incident on the multi-spectral ALS 102 from the same region of the scene 182 along the same direction of incidence. For example, the processing resource 180 is configured to associate different electrical signals generated by corresponding optical detector regions 111a of different subarrays 112 with light incident on the multi-spectral ALS 102 from region 183a of the scene 182 along the same direction of incidence 184a.

Moreover, the processing resource 180 is configured to associate the electrical signal generated by any optical detector region 111a, 111b, 111c, . . . 111i of any given subarray 112 with the optical transmission spectrum of the corresponding optical filter 160. Since each optical filter 160 has a different passband, the different electrical signal values measured by corresponding optical detector regions of different subarrays 112 of optical detector regions are representative of an optical spectrum of the light incident on the multi-spectral ALS 102 from the scene 182 along the same direction of incidence associated with the corresponding optical detector regions of the different subarrays 112 of optical detector regions. For example, the different electrical signal values measured by corresponding optical detector regions 111a of different subarrays 112 of optical detector regions are representative of an optical spectrum of the light incident on the multi-spectral ALS 102 from the scene 182 along the same direction of incidence 184*a* associated with the corresponding optical detector regions 111*a* of the different subarrays 112 of optical detector regions.

The processing resource 180 is configured to determine an ambient light source classification for each direction of incidence 184*a*, 184*b*, 184*c*, . . . 184*i* of the plurality of different directions of incidence 184*a*, 184*b*, 184*c*, . . . 184*i* based on a comparison between the electrical signal values corresponding to each direction of incidence 184*a*, 184*b*, 184*c*, . . . 184*i* and predefined spectral data. The predefined spectral data may, for example, comprise a plurality of discrete spectra, each spectrum corresponding to a different known type or known kind of ambient light source.

In addition, the processing resource 180 is configured to adapt an image sensed by the camera 104 based upon the ambient light source classification for each direction of incidence 184*a*, 184*b*, 184*c*, . . . 184*i*. Specifically, the processing resource 180 is configured to adapt the sensed image by white-balancing the image based upon one or more parameters of the ambient light source classification for each direction, for example by gradient white-balancing the image based upon one or more parameters of the ambient light source classification for each direction of incidence.

One of ordinary skill in the art will understand that various modifications are possible to the multi-spectral ALS 102 described above. For example, FIG. 6A shows a first alternative multi-spectral ALS 202 for use with the multi-spectral ALS arrangement 103. Like the multi-spectral ALS 102 of FIG. 3, the first alternative multi-spectral ALS 202 of FIG. 6A includes a monolithic multi-spectral ALS semiconductor chip 210 which is identical to the monolithic multi-spectral ALS semiconductor chip 110 of the multi-spectral ALS 102. Like the multi-spectral ALS 102 of FIG. 3, the first alternative multi-spectral ALS 202 of FIG. 6A also includes a plurality of passband optical interference filters 260, wherein each optical filter 260 is formed on, or attached to, the monolithic multi-spectral ALS semiconductor chip 210 in front of a corresponding subarray 212 of optical detector regions 211*a*, 211*b*, 211*c*, . . . 211*i*.

The multi-spectral ALS 202 further includes a plurality of lens elements 262 in the form of a micro lens array (MLA) defined by, or formed on, an optical substrate 264. The multi-spectral ALS 202 also includes a spacer 266 located between the monolithic semiconductor chip 210 and the optical substrate 264 of the MLA. Furthermore, the spacer 266 defines a plurality of apertures 268, wherein each aperture 268 is aligned with a corresponding lens element 262, a corresponding optical filter 260 and a corresponding subarray 212 of optical detector regions 211*a*, 211*b*, 211*c*, . . . 211*i*.

However, unlike the multi-spectral ALS 102 of FIG. 3, the first alternative multi-spectral ALS 202 of FIG. 6A includes a plurality of transmissive optical elements in the form of a plurality of additional lens elements 290 provided as an additional micro lens array (MLA) on an additional optical substrate 292. The additional optical substrate 292 is attached to a front surface of the monolithic multi-spectral ALS semiconductor chip 210. A rear surface of the optical substrate 264 is attached to front side of the spacer 266 and a front surface of the additional optical substrate 292 is attached to a rear side of the spacer 266.

Each additional lens element 290 is aligned between a corresponding lens element 262 and a corresponding optical filter 260 such that light which is incident on any one of the lens elements 262 converges through a corresponding additional lens element 290 and a corresponding optical filter 260 onto one of the optical detector regions 211*a*, 211*b*, 211*c*, . . . 211*i* of a corresponding subarray 212 of optical detector regions, and wherein each additional lens element 290 receives convergent light from the corresponding lens element 262 propagating along an initial direction of propagation and transforms the received convergent light into transmitted convergent light which propagates away from the additional lens element 290 along a final direction of propagation which is parallel to an optical axis of the corresponding optical filter 260 or which defines a smaller angle with respect to an optical axis of the corresponding optical filter 260 than the initial direction of propagation of the received convergent light.

The use of such an additional micro lens array (MLA) may serve to ensure that convergent light which is received by any one of the additional lens elements 290 along an initial direction of propagation which is arranged obliquely relative to an optical axis of the corresponding optical filter 260 is transformed by the additional lens elements 290 so as to propagate towards the corresponding optical filter 260 along a direction which is parallel to the optical axis of the corresponding optical filter 260 or which defines a smaller angle with respect to the optical axis of the corresponding optical filter 260 than the initial direction of propagation of the received convergent light. This may be advantageous where the optical transmission spectrum of the optical filter 260 is dependent on the angle of incidence of the light incident on the optical filter 260, for example where the optical filter 260 is an interference filter, to ensure that the light received by the optical filter 260 is subject to the known optical transmission spectrum of the optical filter 260 regardless of the initial direction of propagation along which the convergent light is received by the corresponding additional lens element 290.

In a variant of the first alternative multi-spectral ALS 202 of FIG. 6A, each additional lens element may be defined by, or formed on, a corresponding optical filter 260.

FIG. 6B shows a second alternative multi-spectral ALS 302 for use with the multi-spectral ALS arrangement 103. The second alternative multi-spectral ALS 302 is identical to the first alternative multi-spectral ALS 202 of FIG. 6A in all respects except that rather than including a plurality of transmissive optical elements in the form of a plurality of additional lens elements 290 provided as an additional micro lens array (MLA) on an additional optical substrate 292, the second alternative multi-spectral ALS 302 of FIG. 6B includes a plurality of transmissive optical elements in the form of a plurality of Fresnel lens elements 390 provided as a micro Fresnel lens array, wherein each Fresnel lens element 390 is defined by, or formed on, a corresponding optical filter 360 of the multi-spectral ALS 302.

In a variant of the second alternative multi-spectral ALS 302 of FIG. 6B, each Fresnel lens element 390 may be defined by, or formed on, an additional optical substrate, wherein the additional optical substrate is attached to a front surface of a monolithic multi-spectral ALS semiconductor chip 310 of the multi-spectral ALS 302.

One of ordinary skill in the art will understand that in the first alternative multi-spectral ALS 202 of FIG. 6A and the second alternative multi-spectral ALS 302 of FIG. 6B, the plurality of transmissive optical elements effectively mean that convergent light propagates through each optical interference filter in a direction which is parallel to an optical axis of the optical interference filter or in a direction which is almost parallel to an optical axis of the optical interference filter to thereby ensure that the transmitted light is subject to the known optical transmission spectrum of the optical interference filter at normal incidence. As an alternative to the use of a plurality of transmissive optical elements like the transmissive optical elements 290 of the first alternative multi-spectral ALS 202 of FIG. 6A or the transmissive optical elements 390 of the second alternative multi-spectral ALS 302 of FIG. 6B, the processing resource 180 of the smartphone 101 may be configured to adjust the electrical signal values generated by the different optical detector regions 111a, 111b, 111c, . . . 111i of the same subarray 112 of optical detector regions to compensate for any differences in the optical transmission spectra of the corresponding optical filter 160 arising as a result of propagation of convergent light through the corresponding optical filter 160 along different directions of propagation for the different optical detector regions 111a, 111b, 111c, . . . 111i of the same subarray 112 of optical detector regions.

FIG. 4B shows an alternative monolithic multi-spectral ALS semiconductor chip 410 for use with the multi-spectral ALS 102 of FIGS. 2B and 3, the first alternative multi-spectral ALS 202 of FIG. 6A, or the second alternative multi-spectral ALS 302 of FIG. 6B. The alternative monolithic multi-spectral ALS semiconductor chip 410 defines a plurality of subarrays 412 of optical detector regions in the form of twelve subarrays 412 arranged in a 3×4 array of subarrays 412, wherein the optical detector regions of each subarray 412 have the same relative spatial arrangement as the optical detector regions of each of the other subarrays 412. Specifically, each of the subarrays 412 defines a central optical detector region 411a surrounded by four arcuate optical detector regions 411b, 411c, 411d and 411e. The monolithic multi-spectral ALS semiconductor chip 410 includes a plurality of optical filters 460, each optical filter 460 having a corresponding optical transmission spectrum. Each optical filter 460 may a passband optical interference filter which defines a corresponding spectral passband. Two or more of the optical filters 460 may define different spectral passbands. Moreover, each optical filter 460 is formed on, or attached to, the monolithic multi-spectral ALS semiconductor chip 410 in front of a corresponding subarray 412 of optical detector regions 411a, 411b, 411c, 411d and 411e.

One of ordinary skill in the art will understand that other arrangements of the optical detector regions are possible within each subarray. For example, each subarray may define a central optical detector region surrounded by one or more concentrically arranged annular optical detector regions, wherein each annular optical detector region has a different radius. Each subarray may define a 1D or 2D array of optical detector regions of any size. The optical detector regions of each subarray may be arranged in a 2D array which is non-rectangular.

One of ordinary skill in the art will also understand that other arrangements of the subarrays are possible. For example, the subarrays may be arranged in a 1D or 2D array of any size. The subarrays may be arranged in a 2D pattern which is non-rectangular.

Although various multi-spectral ALS 102, 202, 302 have been described for use with the camera 104 of a smart phone 101, it should be understood that any of the multi-spectral ALS 102, 202, 302 may be used with a camera of an electronic device of any kind. For example, any of the multi-spectral ALS 102, 202, 302 may be used with a camera of a mobile phone, a cell phone, a tablet or a laptop.

Although the disclosure has been described in terms of preferred embodiments as set forth above, it should be understood that these embodiments are illustrative only and that the claims are not limited to those embodiments. Those skilled in the art will be able to make modifications and alternatives to the described embodiments in view of the disclosure which are contemplated as falling within the scope of the appended claims. Each feature disclosed or illustrated in the present specification may be incorporated in any embodiment, whether alone or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of reference signs in the claims should not be construed as limiting the scope of the claims.

The invention claimed is:

1. A multi-spectral optical system comprising:
a monolithic semiconductor chip defining a plurality of subarrays of optical detector regions;
a plurality of optical filters;
a plurality of lens elements;
a processing resource,
wherein each subarray of optical detector regions includes a corresponding plurality of optical detector regions,
wherein each subarray of optical detector regions has the same relative spatial arrangement of optical detector regions as each of the other subarrays of optical detector regions,
wherein each optical filter is aligned between a corresponding lens element and a corresponding subarray of optical detector regions such that light which is incident on each lens element along a direction of incidence from a scene is transmitted by each lens element and converges through the corresponding optical filter onto a corresponding one of the optical detector regions of the corresponding subarray of optical detector regions, which corresponding one of the optical detector regions depends on the direction of incidence so that the corresponding optical detector region of each subarray of optical detector regions detects light incident on the multi-spectral optical sensor along the same direction of incidence,
wherein the multi-spectral optical sensor and the processing resource are configured for communication with one another,
wherein the processing resource is configured to associate different electrical signals generated by different optical detector regions of a same subarray of optical detector regions with light incident on the multi-spectral optical sensor from the scene along corresponding different directions of incidence and to associate different electrical signals generated by corresponding optical detector regions of different subarrays of optical detector regions with light incident on the multi-spectral optical sensor from the scene along the same direction of incidence, and wherein the processing resource is configured to determine an ambient light source classification for each direction of incidence of a plurality of different directions of incidence based on a comparison between electrical signal values corresponding to each direction of incidence for each subarray of optical detector regions and predefined spectral data and, wherein the predefined spectral data comprises a plurality of discrete spectra, each spectrum corresponding to a different known type or kind of ambient light source.

2. The multi-spectral optical system of claim 1, wherein the plurality of subarrays of optical detector regions are arranged in a 1D or 2D array of subarrays or a uniform 1D or 2D array of subarrays.

3. The multi-spectral optical system of claim 1, wherein the plurality of optical detector regions of each subarray of optical detector regions are arranged in a 1D or 2D array of optical detector regions or a uniform 1D or 2D array of optical detector regions.

4. The multi-spectral optical system of claim 1, wherein the plurality of optical detector regions of each subarray of optical detector regions comprise a central optical detector region and one or more peripheral optical detector regions arranged around the central optical detector region.

5. The multi-spectral optical system of claim 4, wherein one or more of the peripheral optical detector regions are arcuate in shape and are arranged circumferentially around the central optical detector region or wherein one or more of peripheral optical detector regions are annular in shape and are arranged concentrically with the central optical detector region.

6. The multi-spectral optical system of claim 1, wherein the plurality of optical filters are disposed or formed on a front surface of the monolithic semiconductor chip.

7. The multi-spectral optical system of claim 1, wherein the plurality of lens elements comprises a micro lens array (MLA) or a micro Fresnel lens array and, wherein the plurality of lens elements are defined by, or formed on, an optical substrate.

8. The multi-spectral optical system of claim 1, comprising a spacer located between the monolithic semiconductor chip and an optical substrate and, wherein the monolithic semiconductor chip and the optical substrate are attached to the spacer.

9. The multi-spectral optical system of claim 8, wherein the spacer defines a plurality of apertures, wherein each aperture is aligned with a corresponding lens element, a corresponding optical filter and a corresponding subarray of optical detector regions.

10. The multi-spectral optical system of claim 1, comprising a plurality of transmissive optical elements, wherein each transmissive optical element is aligned between a corresponding lens element and a corresponding optical filter such that light which is incident on any one of the lens elements converges through a corresponding transmissive optical element and a corresponding optical filter onto one of the optical detector regions of a corresponding subarray of optical detector regions, and wherein each transmissive optical element receives convergent light from the corresponding lens element propagating along an initial direction of propagation and transforms the received convergent light into transmitted convergent light which propagates away from the transmissive optical element along a final direction of propagation which is parallel to an optical axis of the corresponding optical filter or which defines a smaller angle with respect to an optical axis of the corresponding optical filter than the initial direction of propagation of the received convergent light.

11. The multi-spectral optical system of claim 10, wherein the plurality of transmissive optical elements comprises a plurality of additional lens elements and, wherein the plurality of additional lens elements comprises a micro lens array (MLA) or a micro Fresnel lens array and, wherein the plurality of transmissive optical elements are defined by, or formed on, an additional optical substrate and, wherein the additional optical substrate is attached to a front surface of the monolithic semiconductor chip and, wherein a spacer is attached to a front surface of the additional optical substrate and, wherein each transmissive optical element is defined by, or formed on, a corresponding optical filter.

12. The multi-spectral optical system of claim 1, wherein at least one of:
each optical filter comprises an optical interference filter;
each optical filter of the plurality of optical filters has a corresponding passband optical transmission spectrum;
a sum of optical transmission values of the plurality of optical filters is the same at all wavelengths within a predefined range of wavelengths;
optical transmission spectra of at least three of the optical filters are selected for tristimulus detection;
the optical transmission spectra of at least three of the optical filters correspond to respective co-ordinates of a CIE color space;
the optical transmission spectra of at least three of the optical filters correspond to respective components of the XYZ color space.

13. The multi-spectral optical system of claim 1, wherein the processing resource is configured to associate an electrical signal generated by an optical detector region with the optical transmission spectrum of the corresponding optical filter.

14. The multi-spectral optical system of claim 1, wherein the processing resource is configured to adjust the electrical signal values generated by the different optical detector regions of the same subarray of optical detector regions to compensate for any differences in an optical transmission spectra of the corresponding optical filter arising as a result of propagation of convergent light through the corresponding optical filter along different directions of propagation for the different optical detector regions of the same subarray of optical detector regions.

15. An image sensing system, comprising:
the multi-spectral optical system as claimed in claim 1; and
an image sensor having a known spatial relationship relative to the multi-spectral optical sensor,
wherein the image sensor and the processing resource are configured for communication with one another, and
wherein the processing resource is configured to adapt an image sensed by the image sensor based upon the ambient light source classification for each direction of incidence.

16. The image sensing system of claim 15, wherein the processing resource is configured to adapt the image by white-balancing the image based upon one or more parameters of the ambient light source classification for each direction by gradient white-balancing the image based upon one or more parameters of the ambient light source classification for each direction of incidence.

17. An electronic device comprising the multi-spectral optical sensor of claim 1, wherein the electronic device comprises a mobile electronic device, a mobile phone, a cell phone, a smart phone, a tablet, or a laptop.

18. A monolithic semiconductor chip for a multi-spectral optical sensor comprising
- a processor; and
- a multi-spectral optical sensor comprising a plurality of subarrays of optical detector regions, wherein each subarray of optical detector regions includes a corresponding plurality of optical detector regions and wherein the optical detector regions of each subarray of optical detector regions have the same spatial arrangement as the optical detector regions of each of the other subarrays of optical detector regions, and
- wherein the monolithic semiconductor chip comprises a plurality of optical filters, wherein each optical filter is disposed in front of a corresponding subarray of optical detector regions, and wherein the plurality of optical filters is disposed or formed on a front surface of the monolithic semiconductor chip,
- wherein the processor is configured to associate different electrical signals generated by different optical detector regions of a same subarray of optical detector regions with light incident on the multi-spectral optical sensor from a scene along corresponding different directions of incidence and to associate different electrical signals generated by corresponding optical detector regions of different subarrays of optical detector regions with light incident on the multi-spectral optical sensor from the scene along the same direction of incidence, wherein the processor is configured to determine an ambient light source classification for each direction of incidence of a plurality of different directions of incidence based on a comparison between electrical signal values corresponding to each direction of incidence for each subarray of optical detector regions and predefined spectral data and, wherein the predefined spectral data comprises a plurality of discrete spectra, each spectrum corresponding to a different known type or kind of ambient light source.

* * * * *